United States Patent
Line et al.

(10) Patent No.: US 11,577,628 B2
(45) Date of Patent: Feb. 14, 2023

(54) SEAT CONNECTION ASSEMBLY

(71) Applicant: Ford Global Technologies, LLC, Dearborn, MI (US)

(72) Inventors: Johnathan Andrew Line, Northville, MI (US); Jimmy Moua, Canton, MI (US); Deeptej Kudav, Southgate, MI (US); David Frederick Lyons, Jr., New Haven, MI (US); Joshua Gauthier, South Lyon, MI (US); Macit Aktas, Windsor (CA); Joseph Michael Kish, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 502 days.

(21) Appl. No.: 16/774,597

(22) Filed: Jan. 28, 2020

(65) Prior Publication Data

US 2021/0229572 A1 Jul. 29, 2021

(51) Int. Cl.
*B60N 2/015* (2006.01)
*B60N 2/07* (2006.01)
*B60N 2/01* (2006.01)
*B60N 2/02* (2006.01)

(52) U.S. Cl.
CPC ....... *B60N 2/01583* (2013.01); *B60N 2/0155* (2013.01); *B60N 2/01* (2013.01); *B60N 2/0732* (2013.01); *B60N 2002/0264* (2013.01)

(58) Field of Classification Search
CPC .............. B60N 2/01583; B60N 2/0155; B60N 2/0732; B60N 2002/0264

USPC ....................................................... 296/65.03
See application file for complete search history.

(56) References Cited

U.S. PATENT DOCUMENTS

| 5,810,612 | A | 9/1998 | Flask et al. | |
| 6,050,835 | A | 4/2000 | Henrion et al. | |
| 6,752,445 | B1* | 6/2004 | Koehler | H01R 13/629 |
| | | | | 296/65.01 |
| 7,537,469 | B2 | 5/2009 | Takahashi et al. | |
| 8,784,127 | B2* | 7/2014 | Bashkin | H01R 13/62955 |
| | | | | 439/372 |
| 2021/0078510 | A1* | 3/2021 | Line | B60R 16/037 |
| 2021/0094444 | A1* | 4/2021 | Line | B60N 2/0732 |

FOREIGN PATENT DOCUMENTS

| KR | 20050106962 A | 11/2005 | |
| WO | 2009077818 A1 | 6/2009 | |
| WO | WO-2020123595 A1 * | 6/2020 | ......... B60N 2/01541 |

* cited by examiner

Primary Examiner — Hilary L Gutman
(74) Attorney, Agent, or Firm — Vichit Chea; Price Heneveld LLP (57) ABSTRACT

A vehicle seating assembly includes a seat back. A seat base is coupled to the seat back. A track assembly and the seat base are translatable fore and aft along the track assembly. A rail cartridge slidably engages with the track assembly. An actuation assembly includes a first electrical connector coupled to the rail cartridge and a support member coupled to a second electrical connector. The second electrical connector is operable between engaged and disengaged positions relative to the first electrical connector via a sliding engagement of the support member along opposing grooves of an engagement member. The second electrical connector is actuated via an actuator coupled to the second electrical connector.

20 Claims, 9 Drawing Sheets

SEAT CONNECTION ASSEMBLY

FIELD OF THE DISCLOSURE

The present disclosure generally relates to a seat connection assembly. More specifically, the present disclosure relates to a seat connection assembly for a vehicle.

BACKGROUND OF THE DISCLOSURE

Seats in a vehicle are often adjustable and/or removable from within the vehicle. These vehicle seats may be electrically coupled with the vehicle.

SUMMARY OF THE DISCLOSURE

According to at least one aspect of the present disclosure, a vehicle seating assembly includes a seat back. A seat base is coupled to the seat back. The vehicle seating assembly includes a track assembly and the seat base are translatable fore and aft along the track assembly. A rail cartridge is slidably engaged with the track assembly. An actuation assembly includes a first electrical connector coupled to the rail cartridge. A support member is coupled to a second electrical connector. The second electrical connector is operable between engaged and disengaged positions relative to the first electrical connector via a sliding engagement of the support member along opposing grooves of an engagement member. The second electrical connector is actuated via an actuator that is coupled to the second electrical connector.

According to another aspect of the present disclosure, a seating assembly includes a track assembly. A rail cartridge is slidably engaged with the track assembly. A carriage assembly is coupled to the rail cartridge. A seat base is coupled to the carriage assembly and translatable fore and aft along the track assembly. An actuation assembly includes first and second electrical connectors. A support member is coupled to the first electrical connector. An actuator is coupled to the first electrical connector. An engagement member defines opposing grooves. The first electrical connector is operable between engaged and disengaged positions via the engagement between the support member and the opposing grooves of the engagement member.

According to another aspect of the present disclosure, a seat connection assembly includes a track assembly. A rail cartridge is slidably engaged with the track assembly. A carriage assembly is coupled to the rail cartridge. An engagement member is coupled to the rail cartridge. A first electrical connector is slidably engaged with the engagement member. A second electrical connector is coupled to the rail cartridge. An actuator is operably coupled to the first electrical connector. The first electrical connector is operable between an engaged position and a disengaged position via the actuator.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
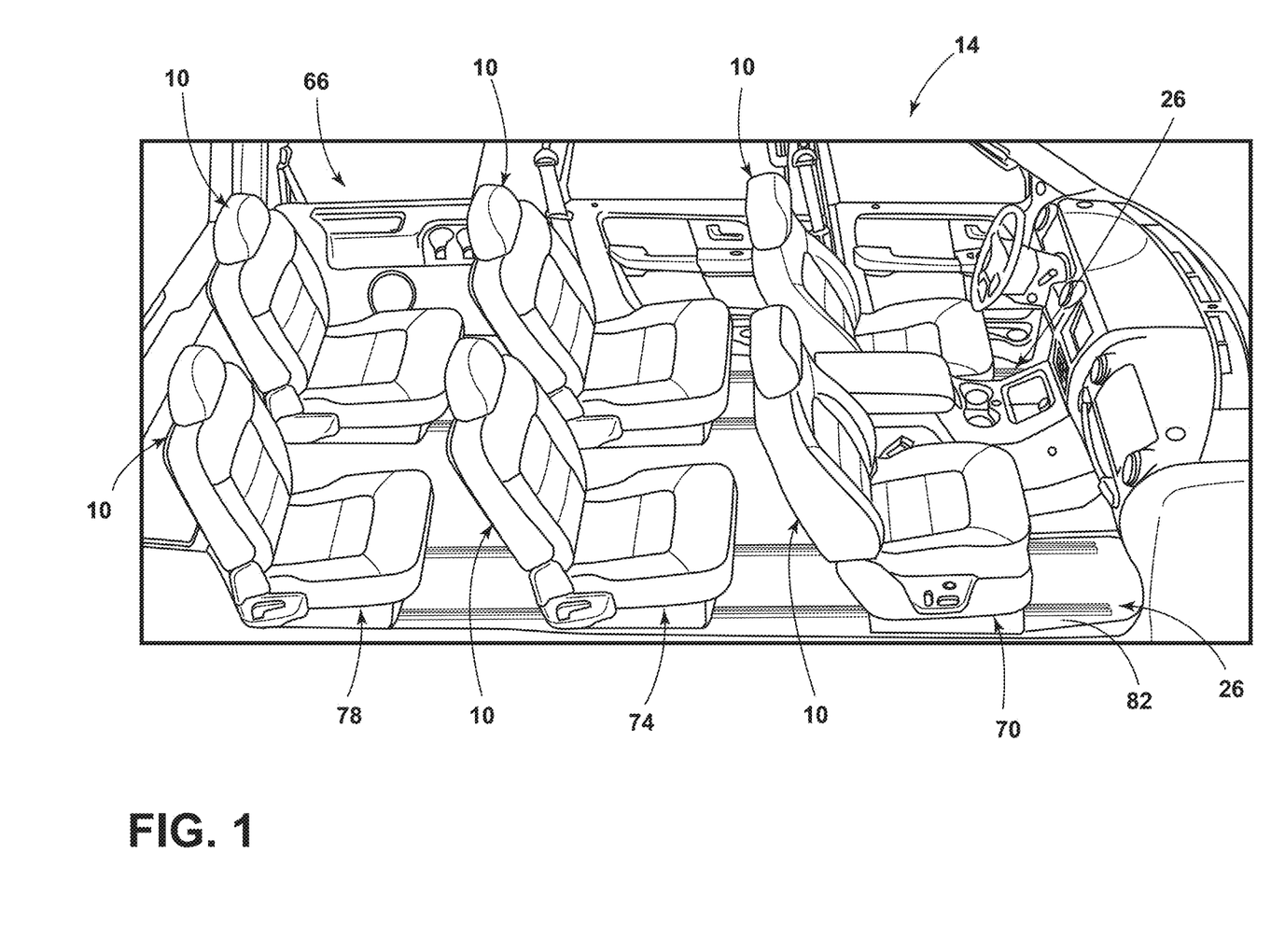
FIG. 1 is a side perspective view of a passenger cabin of a vehicle, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Referring to FIGS. 1-9, reference numeral 10 generally refers to a seating assembly for a vehicle 14 that includes a seat back 18 and a seat base 22 coupled to the seat back 18. The seat base 22 is translatable fore and aft along a track assembly 26. A rail cartridge 30 is slidably engaged with the track assembly 26. An actuation assembly 34 includes a first electrical connector 38 coupled to the rail cartridge 30 and a support member 42 coupled to a second electrical connector 46. The second electrical connector 46 is operable between engaged and disengaged positions relative to the first electrical connector 38 via a sliding engagement of the support member 42 along opposing grooves 50, 54 of an engagement member 58. The second electrical connector 46 is actuated via an actuator 62 coupled to the second electrical connector 46.

Referring to FIG. 1, the vehicle 14 typically includes a passenger cabin 66 having multiple seating assemblies 10. The seating assemblies 10 may be arranged in at least one of a first seating row 70, a second seating row 74, and a third seating row 78. The first seating row 70 is disposed in a vehicle-forward portion of the vehicle 14, the third seating row 78 is disposed in a vehicle-rearward portion of the vehicle 14, and the second seating row 74 is disposed therebetween. It is contemplated that the seating assemblies 10 may be disposed between the defined seating rows (e.g., the first, second, and third seating rows 70, 74, 78) without departing from the teachings herein. The vehicle 14 may be a sedan, a sport utility vehicle, a van, a truck, a crossover, or another style vehicle 14. The vehicle 14 may be a manually operated vehicle 14 (e.g., with a human driver), a fully autonomous vehicle 14 (e.g., no human driver), or a partially autonomous vehicle 14 (e.g., may be operated with or without a human driver). Additionally, the vehicle 14 may be utilized for personal and/or commercial purposes, such as for ride-providing services (e.g., chauffeuring) and/or ride-sharing services.

Figure 2:
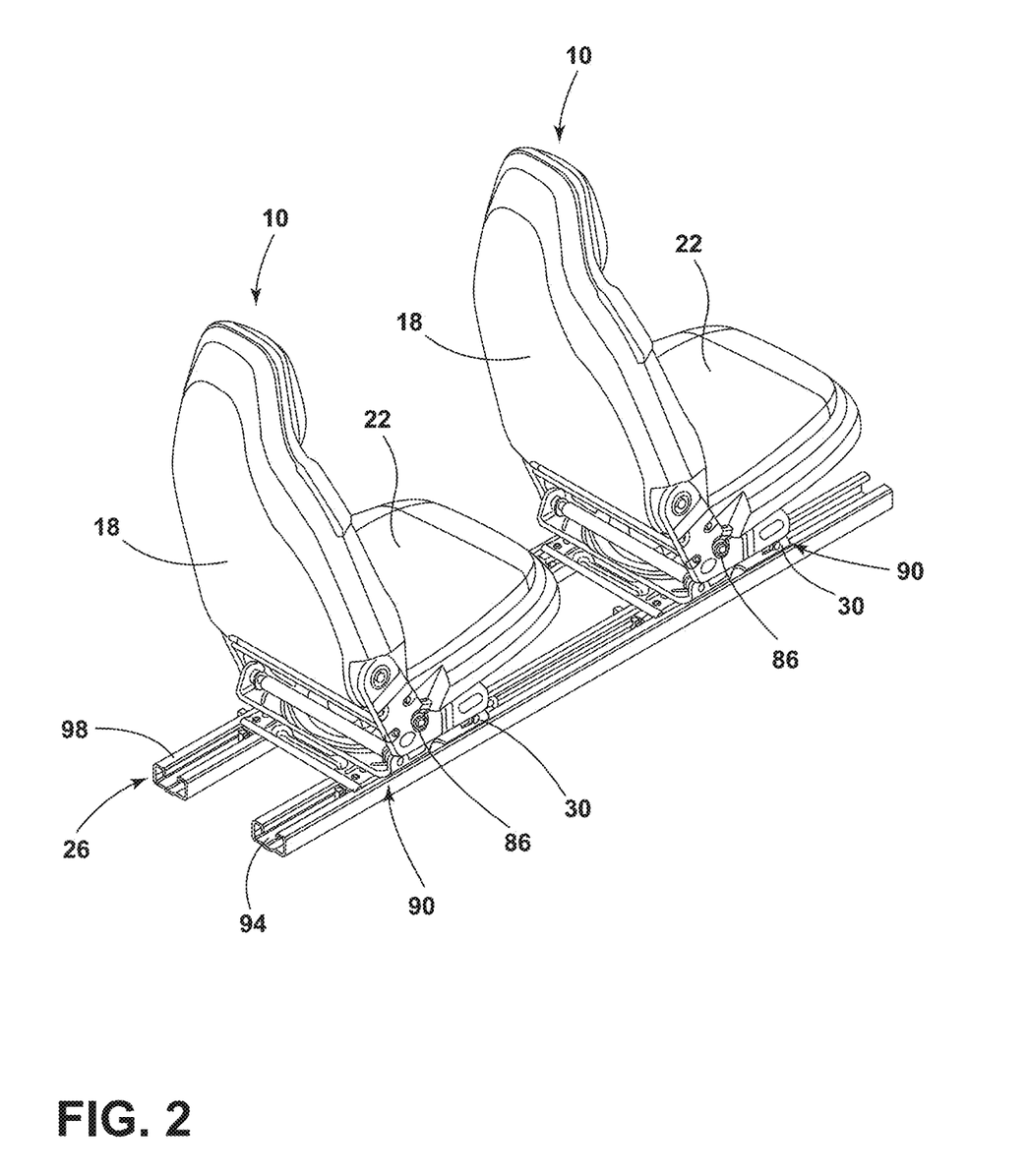
FIG. 2 is a side perspective view of vehicle seating assemblies disposed on a track assembly, according to one example.

Referring to FIGS. 1 and 2, the vehicle 14 may include the track assembly 26 disposed on a vehicle floor 82. Each seating assembly 10 may be positioned along the track assembly 26. As illustrated in FIG. 1, the track assembly 26 extends between the first seating row 70 and the third seating row 78. Accordingly, the seating assemblies 10 are translatable between fore and aft positions along the track assembly 26. In various examples, the vehicle 14 may include two track assemblies 26. In this way, the seating assemblies 10 on a driver-side of the vehicle 14 may be coupled to one track assembly 26 and the seating assemblies 10 on a passenger-side of the vehicle 14 may be coupled to an additional track assembly 26. It is contemplated that the track assemblies 26 may be substantially similar to one another.

The seating assemblies 10 may be independently translatable, such that a single seating assembly 10 can be moved along the track assembly 26. Additionally or alternatively, the seating assemblies 10 may be stored within the vehicle 14 and/or removable from the vehicle 14 to allow for movement of another seating assembly 10 between the fore and aft positions. According to various aspects, there may not be seating assemblies 10 disposed in at least one of the first, second, and/or third seating row 70, 74, 78. The track assemblies 26 may provide various seating configurations in the vehicle 14 for a variety of user purposes.

Each of the seating assemblies 10 may include the seat back 18 operably coupled to the seat base 22. In various examples, the seat base 22 and the seat back 18 may be pivotally coupled to one another. The seating assemblies 10 may each include a positioning motor 86 for adjusting the seat back 18 relative to the seat base 22. The seat base 22 may be coupled to a carriage assembly 90. The seating assemblies 10 may each be coupled to the respective track assembly 26 by the carriage assembly 90. Stated differently, the seat base 22 may be coupled to the carriage assembly 90 and the carriage assembly 90 may be coupled to one or more rail cartridges 30 associated with the track assembly 26.

Each track assembly 26 may include one or more rails 94, 98. The rails 94, 98 of each track assembly 26 may be positioned within the vehicle 14 and spaced-apart from one another, as illustrated in FIGS. 1 and 2. The rails 94, 98 can be arranged along longitudinal, lateral, and/or angular (e.g., diagonal) directions within the passenger cabin 66. Each rail 94, 98 may be integrally formed with the vehicle floor 82, or alternatively, may be coupled to the vehicle floor 82. The rails 94, 98 may be positioned beneath a floor cover of the vehicle 14, or alternatively, may extend above the floor cover of the vehicle 14 and protrude into the passenger cabin 66. Stated differently, the rails 94, 98 of the track assembly 26 may be visible or hidden to an occupant within the vehicle 14 depending on the configuration of the vehicle 14.

Figure 3:
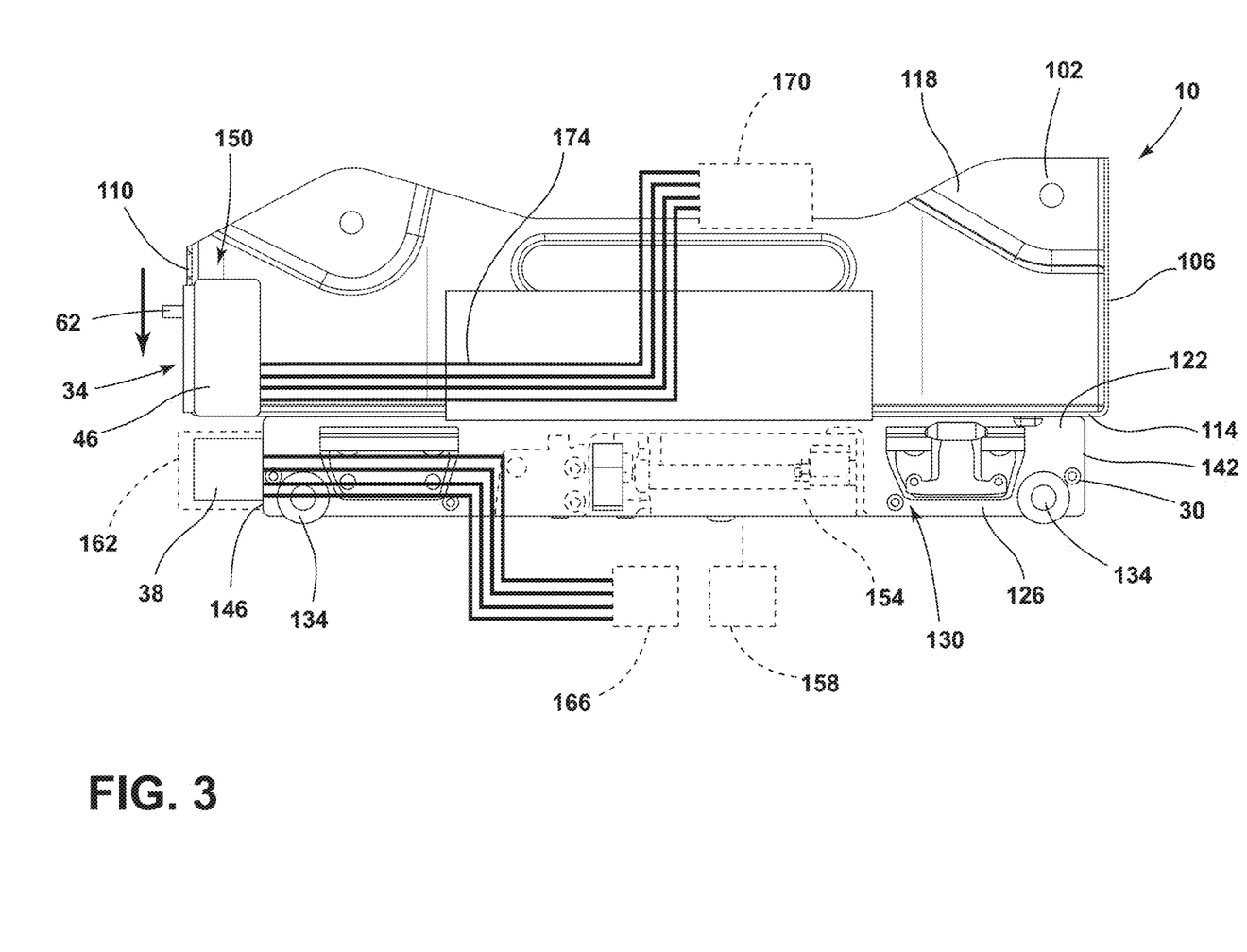
FIG. 3 is a cross-sectional view of an interface between a carriage assembly and a rail cartridge for a vehicle seating assembly with first and second electrical connectors disengaged, according to one example.
Figure 4:
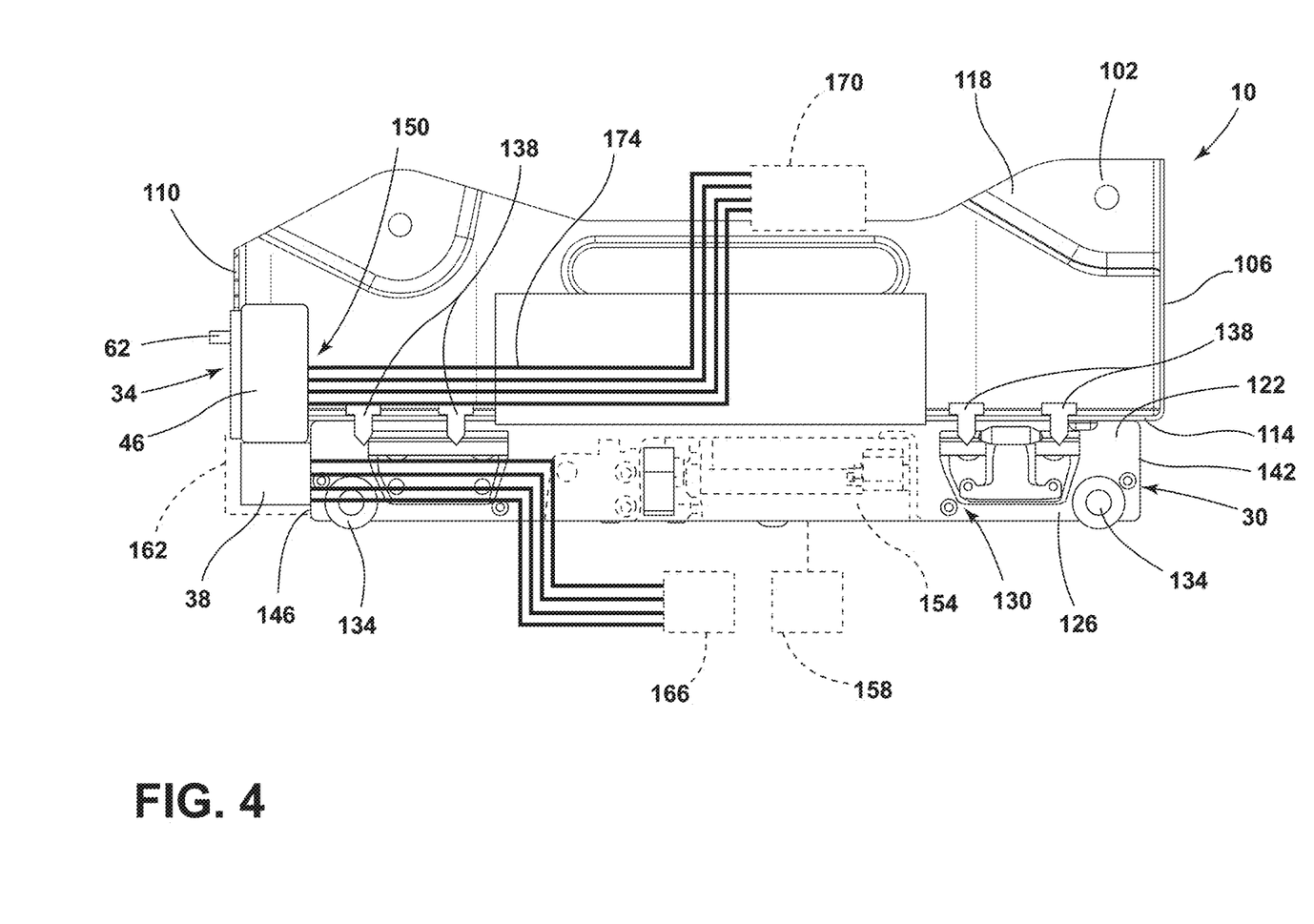
FIG. 4 is a cross-sectional view of the interface of FIG. 3 with the first and second electrical connectors engaged.

Referring to FIGS. 2-4, the seating assembly 10 may slidably engage the track assembly 26 via the carriage assembly 90. The carriage assembly 90 may be coupled to a lower surface of the seat base 22. The carriage assembly 90 may include a carriage bracket 102, which may include first and second end walls 106, 110 that extend vertically from a carriage base 114. A bracket sidewall 118, the first and second end walls 106, 110, and the carriage base 114 may define a cavity for housing the second electrical connector 46.

The carriage bracket 102 may be selectively coupled to the rail cartridge 30. The rail cartridge 30 may be an elongated member that includes upper and lower portions 122, 126 that define a channel 130 therein. The rail cartridge 30 may be configured to move along the respective track assembly 26. In various examples, two rail cartridges 30 may be coupled to a single seating assembly 10 and configured to move the seating assembly 10 along the rails 94, 98 of the track assembly 26 associated with the seating assembly 10. The two rail cartridges 30 may be substantially similar. Alternatively, the two rail cartridges 30 may be different, such that one rail cartridge 30 is a lead cartridge and the other is a follower cartridge. The rail cartridge 30 may include wheels 134 configured to engage the corresponding rail 94, 98. The rail cartridge 30 may have a width less than a width of a space defined by outer supports of the respective rail 94, 98. Stated differently, the rail cartridge 30 may be disposed within one of the rails 94, 98 and configured to translate fore and aft.

The carriage bracket 102 may be coupled to the upper portion 122 of the rail cartridge 30. In various examples, the carriage bracket 102 may be mechanically fastened to the rail cartridge 30 by a fastener 138. The fastener 138 may be, for example, a screw, a bolt, a rivet, or another similar coupling feature. In the depicted example of FIGS. 3 and 4, when the carriage bracket 102 is coupled to the rail cartridge 30, the first end wall 106 may be substantially vertically aligned with a first end 142 of the rail cartridge 30. The second end wall 110 may be offset from a second end 146 of the rail cartridge 30. In this way, the carriage bracket 102 may extend longer than the rail cartridge 30 and define an overhang portion 150 that extends past the second end 146 of the rail cartridge 30.

The rail cartridge 30 may include a motor 154 disposed within the channel 130. The motor 154 may be configured to laterally translate the rail cartridge 30 between fore and aft positions along the track assembly 26. The motor 154 may be operably coupled to a controller 158. The controller 158 may include a processor, a memory, and other control circuitry. Instructions or routines relating to various functions are stored within the memory and executed by the processor. The directions may include at least one instruction for operating the motor 154. For example, the instructions may include operation speeds for the motor 154, which may be adjustable via pulse width modulation (PWM) controls. Such PWM controls may be advantageous for adjusting the speed of operation of the motor 154. When the corresponding seating assembly 10 is occupied by a passenger, the PWM controls may provide for the motor 154 to run at a lower duty cycle for slower stops when the seating assembly 10 reaches the selected position.

Referring still to FIGS. 3 and 4, the second electrical connector 46 may be disposed within the carriage bracket 102 proximate the second end wall 110. According to various aspects, a spacer 162 may be coupled to the second end 146 of the rail cartridge 30. The spacer 162 may vertically align with the overhang portion 150. The first electrical connector 38 may be disposed within, or otherwise, coupled to the spacer 162. The second electrical connector 46 may be vertically aligned with the first electrical connector 38. Once the carriage bracket 102 is coupled to the rail cartridge 30, the second electrical connector 46 may be disposed over the first electrical connector 38 and may be in a disengaged position relative to the first electrical connector 38. Once the carriage bracket 102 is coupled to the rail cartridge 30, the second electrical connector 46 can be moved to the engaged position and to engage the first electrical connector 38 via the actuator 62. In the depicted configuration, the actuator 62 is operable between a raised position and a lowered position. The raised position may align with the disengaged position of the second electrical connector 46, and the lowered position may align with the engaged position of the second electrical connector 46.

The first electrical connector 38 may be operably coupled to a bus bar 166, or other conductive terminal. The bus bar 166 may be, for example, a lead frame bus bar 166 that provides an electric current to the track assembly 26. The second electrical connector 46 may be operably coupled to a seat control module 170 disposed within the seating assembly 10 via a wiring harness 174. In this way, the electric current may be transferred from the bus bar 166, through the first and second electrical connectors 38, 46, through the wiring harness 174, and to the seat control module 170, thereby providing the electrical connection between the vehicle 14 and a seating assembly 10.

The first and second electrical connectors 38, 46 may be mating connectors. In this way, the first electrical connector 38 may be a female connector and the second electrical connector 46 may be a male connector. Alternatively, the first electrical connector 38 may be the male connector and the second electrical connector 46 may be the female connector. It is contemplated that the first and second electrical connectors 38, 46 may be any mating connectors that establish the electrical connection. Further, either of the first and second electrical connectors 38, 46 may include float tolerances to properly align the first and second electrical connectors 38, 46.

Figure 5:
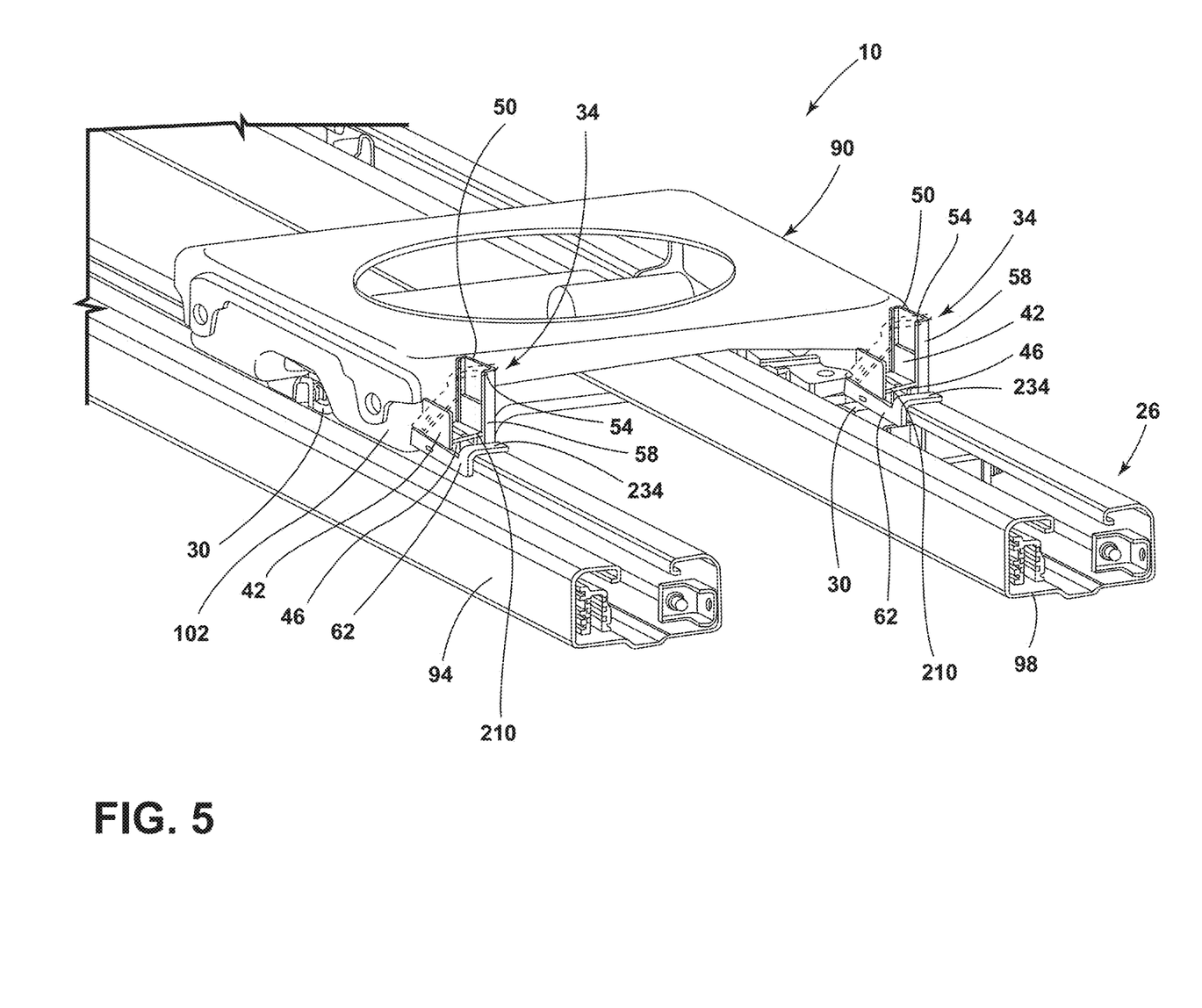
FIG. 5 is a partial front perspective view of a track assembly, according to one example.
Figure 6:
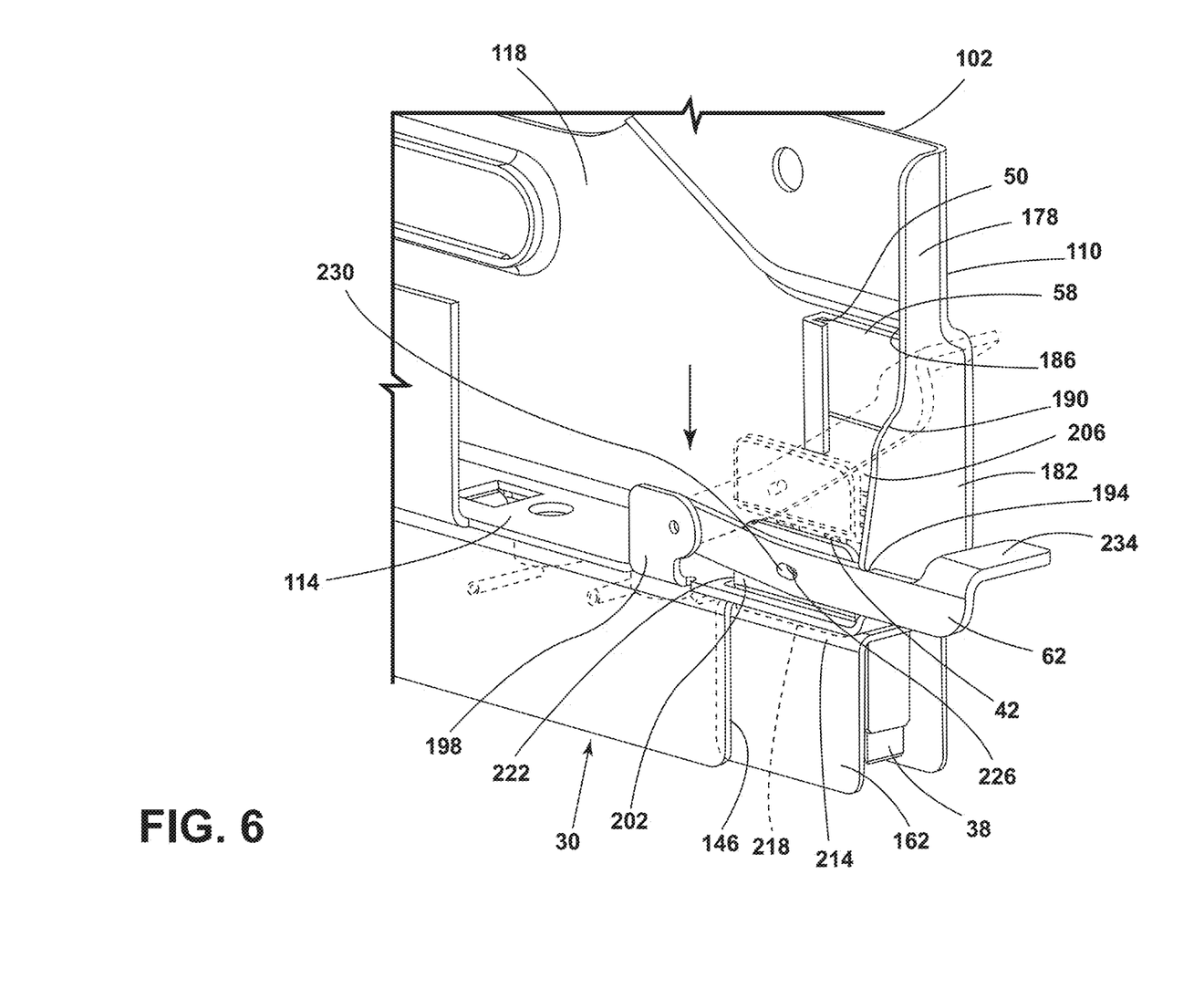
FIG. 6 is a partial front perspective view of an actuation assembly for the track assembly of FIG. 5.

Referring to FIGS. 5 and 6, the second end wall 110 can have a first width proximate a top portion 178 and a second width proximate a bottom portion 182. The second width may be greater than the first width. The second end wall 110 may include a sloping edge 186 extending between the top and bottom portions 178, 182. The actuator 62 may be configured to slide along the sloping edge 186 between the raised and lowered positions. The sloping edge 186 may include a ledge 190 where the actuator 62 may rest and/or be retained when the second electrical connector 46 is in the disengaged position. As the second electrical connector 46 is moved toward the engaged position via the actuator 62, the actuator 62 may engage the sloping edge 186 and may come to rest in a notch 194 defined in the bottom portion 182 of the second end wall 110. The notch 194 may retain the actuator 62 in the lowered position, and thereby retain the second electrical connector 46 in the engaged position.

In various examples, the actuator 62 may be rotatably coupled to the carriage assembly 90. The carriage base 114 may include a connecting flange 198 extending upwardly therefrom. The actuator 62 may be rotatably coupled to the connecting flange 198 and extend outwardly from the second end wall 110.

According to various aspects, the actuation assembly 34 may include the engagement member 58. As illustrated in FIG. 3, the engagement member 58 may be coupled to the carriage assembly 90 adjacent to the carriage bracket 102. As illustrated in FIG. 6, in another non-limiting example, the engagement member 58 may be coupled to the carriage base 114 of the carriage bracket 102 adjacent to the bracket sidewall 118. The engagement member 58 may define the opposing grooves 50, 54 to receive the support member 42.

Still referring to FIGS. 5 and 6, the support member 42 includes opposing sidewalls 202, 206 and a connecting base 210 extending therebetween. In various examples, the support member 42 may be generally U-shaped with the opposing sidewalls 202, 206 extending vertically from the connecting base 210. The support member 42 is coupled to the second electrical connector 46. The second electrical connector 46 may extend through the connecting base 210 to engage the first electrical connector 38.

The first electrical connector 38 may be coupled to the rail cartridge 30. The spacer 162 may be coupled to the second end 146 of the rail cartridge 30. As illustrated in FIG. 6, the spacer 162 may have an open bottom portion. An upper portion 214 of the spacer 162 may define an opening 218 to receive the second electrical connector 46 as the second electrical connector 46 is moved to engage with the first electrical connector 38. The carriage base 114 may define a corresponding opening 222 configured to align with the opening 218 of the spacer 162 when the carriage bracket 102 is coupled with the rail cartridge 30. In this way, the second electrical connector 46 can move through both openings 218, 222 to engage the first electrical connector 38.

The support member 42 may slidably engage with the engagement member 58. One of the opposing sidewalls 202, 206 may be disposed within the opposing grooves 50, 54 of the engagement member 58. The opposing grooves 50, 54 may be substantially vertical, such that the support member 42 may slide upwards and downwards relative to the engagement member 58. According to various aspects, the actuator 62 may be coupled to the support member 42. One of the opposing sidewalls 202, 206 may engage the engagement member 58 and the other opposing sidewall 202, 206 may be coupled to the actuator 62. The sidewall 202 may include a projection 226 extending outwardly away from the engagement member 58. The actuator 62 may define a receiving aperture 230 to receive the projection 226 and rotatably couple the actuator 62 to the support member 42. In such configurations, the actuator 62 may be rotatably coupled to the connecting flange 198 and the support member 42.

As best illustrated in FIG. 5, the actuation assembly 34 may be a separate component relative to the carriage assembly 90. In this way, the actuation assembly 34 may be disposed adjacent to the carriage assembly 90. In such examples, the actuation assembly 34 may be coupled to the carriage assembly 90 and may operate independently therefrom (e.g., the actuator 62 may be free of direct engagement with the carriage assembly 90). This may provide greater versatility and flexibility for using the actuation assembly 34 with various seating assemblies 10 and track assemblies 26.

Referring again to FIGS. 5 and 6, in operation, the carriage bracket 102 may be coupled with the rail cartridge 30. The second electrical connector 46 may initially be in the disengaged position. A force may be applied to the actuator 62 to move the second electrical connector 46 toward the first electrical connector 38. The actuator 62 may be rotatably coupled to the carriage assembly 90 through the connecting flange 198 and with the support member 42. Alternatively, the actuator 62 may be rotatably coupled with the support member 42 and may be free of a direct engagement with the carriage assembly 90. The actuator 62 may be rotated from the raised position to the lowered position, thereby moving the second electrical connector 46 toward the engaged position and the first electrical connector 38. In various examples, the actuator 62 may have a handle 234, which can provide a location for force to be applied to the actuator 62. When in the lowered position, the handle 234 may engage an outer surface of one of the rails 94, 98. In such configurations, the handle 234 may correspond with the shape one of the outer supports of the rails 94, 98.

Figure 7:
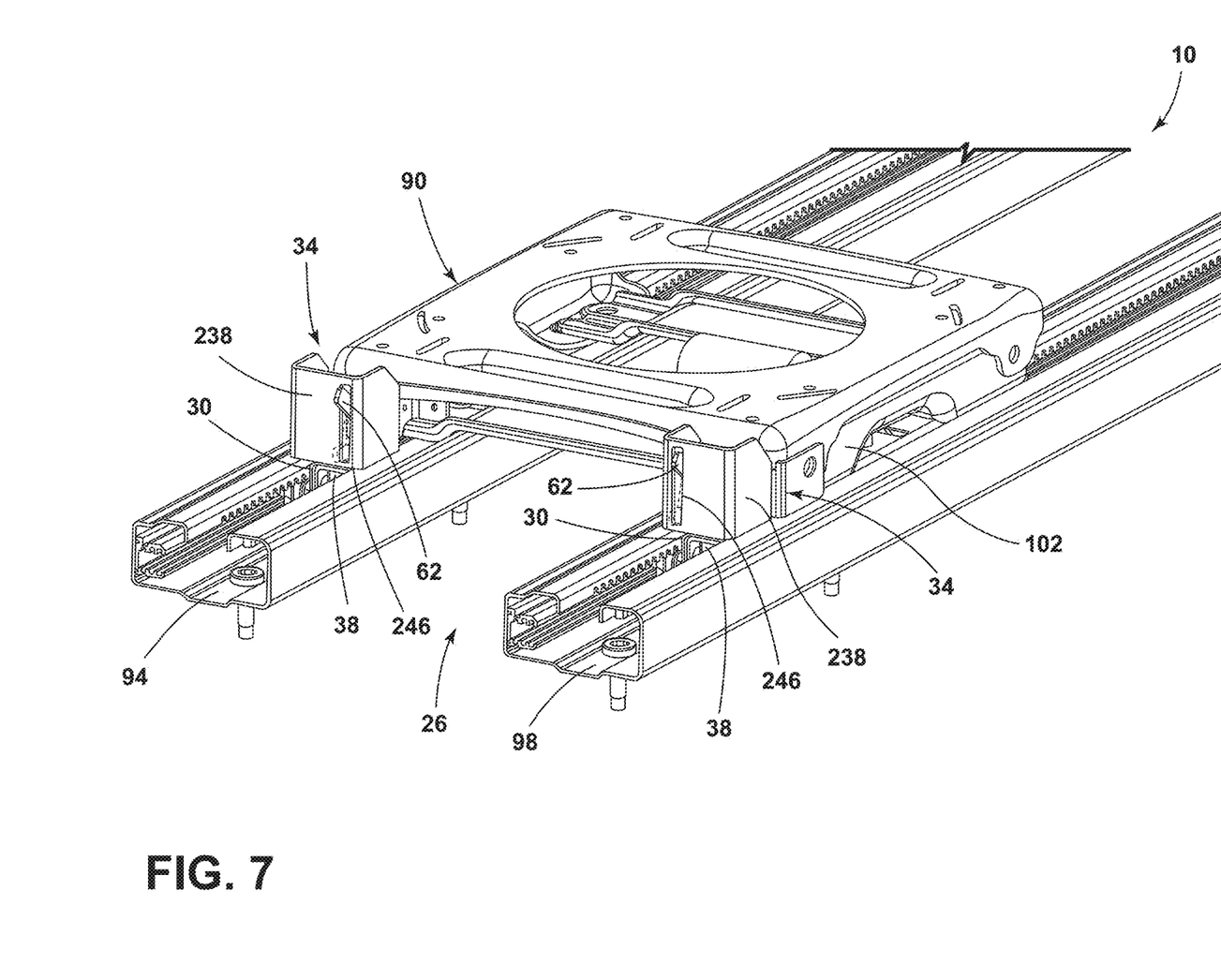
FIG. 7 is a front perspective view of a track assembly, according to one example.
Figure 8:
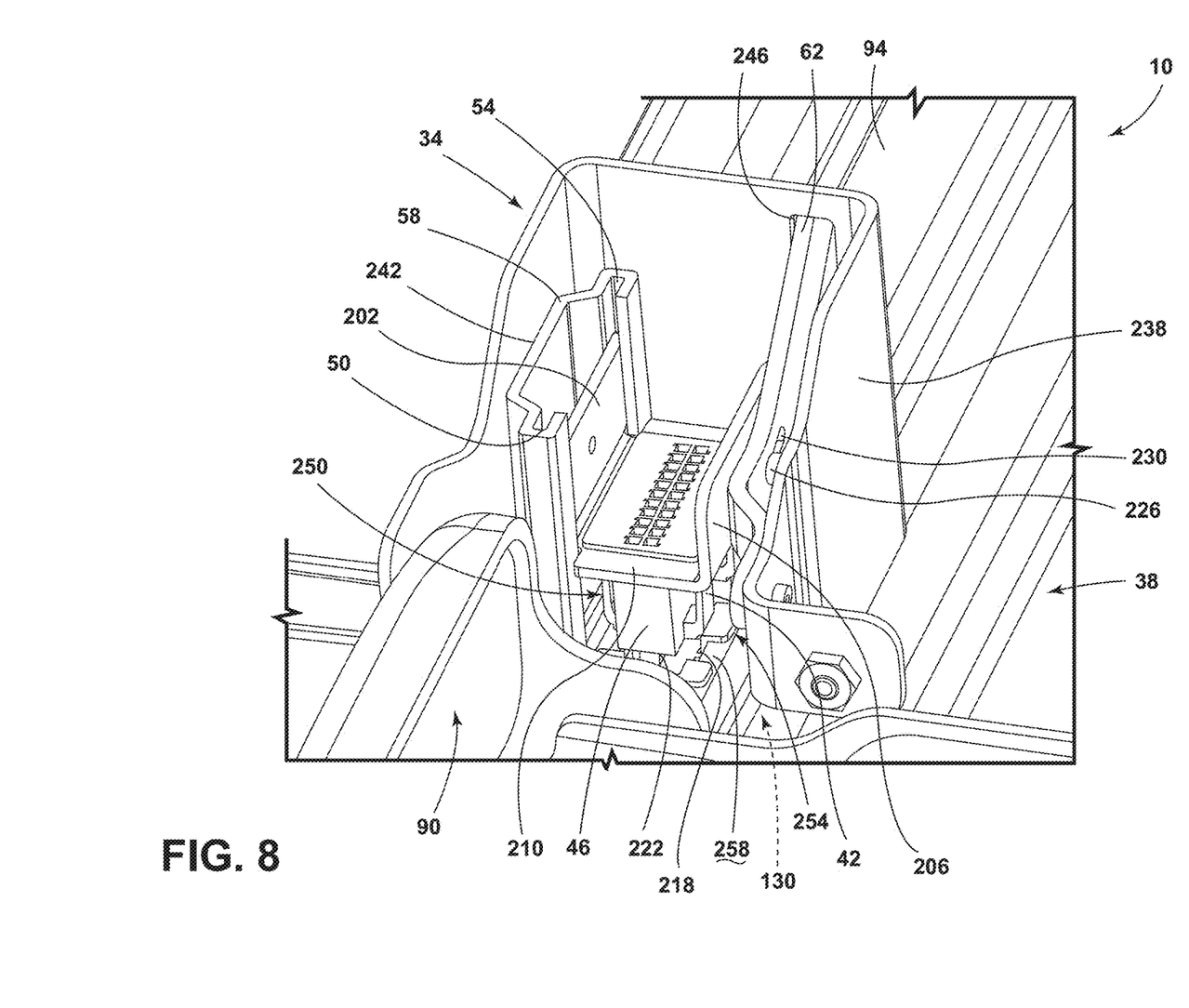
FIG. 8 is a rear perspective view of an actuation assembly for the track assembly of FIG. 7 with an actuator in a raised position, according to one example.
Figure 9:
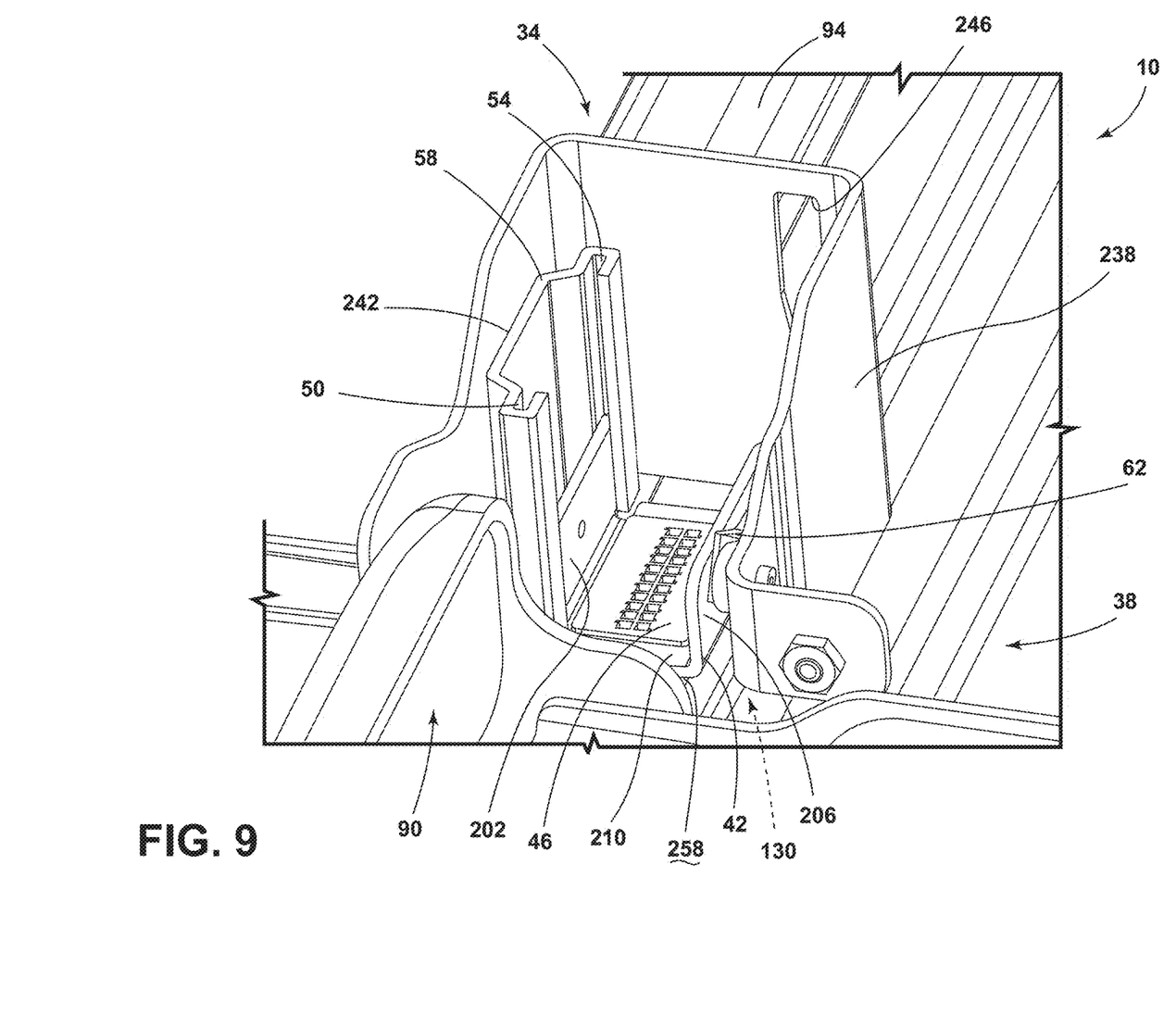
FIG. 9 is a rear perspective view of the actuation assembly of FIG. 8 with the actuator in a lowered position.

Referring to FIGS. 7-9, the actuation assembly 34 may include the first and second electrical connectors 38, 46, the support member 42, the engagement member 58, the actuator 62, and a cover member 238. In such configurations, the actuation assembly 34 may be a separate component coupled with the carriage assembly 90. The carriage bracket 102 may not extend longer than the rail cartridge 30. The first electrical connector 38 may be disposed within the spacer 162 (as best illustrated in FIG. 5), or alternatively, may be disposed within the rail cartridge 30. In examples where the first electrical connector 38 is disposed within the channel 130 of the rail cartridge 30, the rail cartridge 30 may extend longer than the carriage assembly 90 to accommodate the actuation assembly 34 disposed on the rail cartridge 30 adjacent to the carriage assembly 90. The length of the actuation assembly 34 combined with the carriage assembly 90 may be substantially equal to the length of the rail cartridge 30.

The second electrical connector 46 may extend through the connecting base 210 of the support member 42. The sidewalls 202, 206 of the support member 42 may extend vertically upward from the connecting base 210. One of the sidewalls 206 may be disposed within the opposing grooves 50, 54 of the engagement member 58. A connecting wall 242 of the engagement member 58 may be offset from the grooves 50, 54. This may prevent a sliding engagement between the connecting wall 242 and the support member 42. This configuration may be advantageous for reducing frictional engagement between the engagement member 58 and the support member 42. The other sidewall 202 may couple with the actuator 62. The sidewall 202 may include the projection 226 received within the receiving aperture 230 of the actuator 62.

The cover member 238 may extend at least partially around the engagement member 58, the support member 42, and the second electrical connector 46 and coupled to the carriage assembly 90. The cover member 238 may couple the actuation assembly 34 with the carriage assembly 90. In various examples, the actuator 62 may be rotatably coupled with the cover member 238. In such configurations, the actuator 62 may be rotatably coupled with the cover member 238 and the support member 42.

The cover member 238 may be a substantially same height as the carriage assembly 90 relative to the track assembly 26. In this way, the seat base 22 (FIG. 1) may be disposed on the carriage assembly 90 with minimal or no interference by the actuation assembly 34. The cover member 238 may define a slot 246 in which the actuator 62 extends through. As illustrated, the cover member 238 defines a substantially vertical slot 246 allowing for the actuator 62 to move between the raised and lowered positions. The slot 246 may be defined on an opposing side of the cover member 238 relative to where the cover member 238 couples with the carriage assembly 90.

As best illustrated in FIG. 8, the support member 42 may include alignment features 250 extending from the connecting base 210 and the second electrical connector 46. As illustrated, the alignment features 250 extend vertically from the connecting base 210 on opposing sides of the second electrical connector 46 and curve inward coupled with the second electrical connector 46. The rail cartridge 30 may include corresponding guide members 254 proximate the opening 218. The guide members 254 may be offset from the alignment features 250. In this way, each alignment feature 250 may move between adjacent guide members 254 as the second electrical connector 46 is lowered. The alignment features 250 and the guide members 254 may be advantageous for properly aligning the second electrical connector 46 with the first electrical connector 38.

Referring still to FIGS. 7-9, in operation, the actuation assembly 34 may be coupled to the carriage assembly 90 and the rail cartridge 30. The actuation assembly 34 may be coupled to a vehicle-rearward, or alternatively, a vehicle-forward portion of the carriage assembly 90. In examples where the first electrical connector 38 is disposed within the spacer 162 (FIG. 5), the second electrical connector 46 may move through the opening 218 defined in the spacer 162 to engage the first electrical connector 38. In examples where the first electrical connector 38 is disposed within the rail cartridge 30, the rail cartridge 30 may define the opening 218 to receive the second electrical connector 46 when the second electrical connector 46 engages the first electrical connector 38. The second electrical connector 46 may initially be in a disengaged position. Accordingly, the actuator 62 may initially be in the raised position. The actuator 62 may be lowered, which lowers the second electrical connector 46 toward the first electrical connector 38 until the first and second electrical connectors 38, 46 are engaged providing the electrical connection to the seating assembly 10. The support member 42 may lower with the second electrical connector 46 until the connecting base 210 rests on the upper portion 122 of the rail cartridge 30.

Referring to FIGS. 1-9, the first and second electrical connectors 38, 46 may provide an electrical connection between the vehicle 14 and the seating assembly 10. The seat base 22 may be disposed on the carriage assembly 90. The second electrical connector 46 may slidably engage the engagement member 58 via the support member 42 to move from the disengaged position to the engaged position. The second electrical connector 46 may extend through the opening 218 in the spacer 162, or alternatively through the opening 218 in the upper portion 122 of the rail cartridge 30 depending on the configuration of the actuation assembly 34. The second electrical connector 46 may be lowered until the connecting base 210 of the support member 42 abuts an upper surface 258 of the spacer 162 or the upper portion 122 of the rail cartridge 30. The first and second electrical connectors 38, 46 can mate to provide the electrical connection to the seating assembly 10. The seating assembly 10 may be removed from the rail cartridge 30, which may disrupt the electrical connection between the vehicle 14 and the seating assembly 10. The actuator 62 may be moved from the lowered position to the raised position, thereby moving the second electrical connector 46 from the engaged position to the disengaged position. Once the second electrical connector 46 disengages from the first electrical connector 38, the electrical connection may be disrupted. The fasteners 138 may be removed from the carriage assembly 90, and the seating assembly 10 may then be lifted off the rail cartridge 30.

Use of the present device may provide for a variety of advantages. For example, the actuation assembly 34 may provide an electrical connection between the vehicle 14 and the seating assembly 10. Further, the actuation assembly 34 may be a separate component coupled to the carriage assembly 90, which may provide for greater flexibility in the use of the actuation assembly 34 with different configurations of the seating assemblies 10. Additionally, force may be applied to the actuator 62 of the actuation assembly 34 to move the second electrical connector 46 between the engaged and disengaged positions. Moreover, the electrical connection may be maintained when the seating assembly 10 is coupled to the rail cartridge 30, and interrupted upon removal of the seating assembly 10. Further, the first and second electrical connectors 38, 46 may be disposed in a variety of locations relative to the carriage assembly 90 and the rail cartridge 30. Also, the support member 42 may provide for a sliding engagement with the engagement member 58 for moving the second electrical connector 46 between the engaged and disengaged positions. Additionally, the wiring harness 174 may be retained within the seating assembly 10 may not be moved across the vehicle 14 as the seating assembly 10 translates fore and aft. Further, the first and second electrical connectors 38, 46 may self-align via the float tolerances, which may correct and/or prevent misalignment between the first and second electrical connectors 38, 46. These and other advantages may be realized and/or achieved.

According to various examples, a vehicle seating assembly includes a seat back. A seat base is coupled to the seat back. A track assembly and the seat base are translatable fore and aft along the track assembly. A rail cartridge is slidably engaged with the track assembly. An actuation assembly includes a first electrical connector coupled to the rail cartridge and a support member coupled to a second electrical connector. The second electrical connector is operable between engaged and disengaged positions relative to the first electrical connector via a sliding engagement of the support member along opposing grooves of an engagement member. The second electrical connector is actuated via an actuator coupled to the second electrical connector. Embodiments of the present disclosure may include one or a combination of the following features:

- an actuation assembly includes a cover member extending at least partially around a second electrical connector;
- a cover member defines a slot, and actuator extends through the slot;
- an actuator is rotatably coupled between a support member and a cover member;
- a first electrical connector is disposed within a rail cartridge;
- an upper portion of a rail cartridge defines a receiving aperture, and a second electrical connector extends through the receiving aperture to engage a first electrical connector;
- a carriage assembly is coupled to a seat base and includes a carriage bracket defining a notch, and an actuator is disposed within the notch when in a lowered position; and
- a carriage defines a connecting flange extending from a carriage base, and an actuator is rotatably coupled to the connecting flange and a support member.

According to various examples, a seating assembly includes a track assembly. A rail cartridge is slidably engaged with the track assembly. A carriage assembly is coupled to the rail cartridge. A seat base is coupled to the carriage assembly and translatable fore and aft along the track assembly. An actuation assembly includes first and second electrical connectors. A support member is coupled to the first electrical connector. An actuator is coupled to the first electrical connector. An engagement member defines opposing grooves. The first electrical connector is operable between engaged and disengaged positions via the engagement between the support member and the opposing grooves of the engagement member. Embodiments of the present disclosure may include one or a combination of the following features:

- a spacer is coupled to an end of a rail cartridge and a second electrical connector is disposed within the spacer;
- a spacer defines an opening in an upper portion thereof to receive a first electrical connector when in an engaged position;

a support member abuts an upper surface of a spacer when a first electrical connector is in an engaged position; and a support member includes opposing sidewalls and an actuator is coupled to one of the opposing sidewalls.

According to various examples, a seat connection assembly includes a track assembly. A rail cartridge is slidably engaged with the track assembly. A carriage assembly is coupled to the rail cartridge. An engagement member is coupled to the rail cartridge. A first electrical connector is slidably engaged with the engagement member. A second electrical connector is coupled to the rail cartridge. An actuator is operably coupled to the first electrical connector. The first electrical connector is operable between an engaged position and a disengaged position via the actuator. Embodiments of the present disclosure may include one or a combination of the following features:

- a support member is coupled to the first electrical connector and slidably engaged with an engagement member;
- an actuator is rotatably coupled to a support member, and the actuator is operable between raised and lowered positions;
- a support member includes opposing sidewalls coupled together via a connecting base, and a first electrical connector extends through a connecting base;
- a cover member extending at least partially around a first electrical connector;
- a cover member defines a vertical slot, and an actuator extends through the slot; and
- a bracket is coupled to a carriage assembly, and the bracket defines a notch for retaining an actuator when a first electrical connector is in an engaged position.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly, comprising:
a seat back;
a seat base coupled to the seat back;
a track assembly, wherein the seat base is translatable fore and aft along the track assembly;
a rail cartridge slidably engages with the track assembly; and
an actuation assembly including a first electrical connector coupled to the rail cartridge and a support member coupled to a second electrical connector, wherein the second electrical connector is operable between engaged and disengaged positions relative to the first electrical connector via a sliding engagement of the support member along opposing grooves of an engagement member, and wherein the second electrical connector is actuated via an actuator coupled to the second electrical connector.

2. The vehicle seating assembly of claim 1, wherein the actuation assembly includes a cover member extending at least partially around the second electrical connector.

3. The vehicle seating assembly of claim 2, wherein the cover member defines a slot, and wherein the actuator extends through the slot.

4. The vehicle seating assembly of claim 2, wherein the actuator is rotatably coupled between the support member and the cover member.

5. The vehicle seating assembly of claim 1, wherein the first electrical connector is disposed within the rail cartridge.

6. The vehicle seating assembly of claim 5, wherein an upper portion of the rail cartridge defines a receiving aperture, and wherein the second electrical connector extends through the receiving aperture to engage the first electrical connector.

7. The vehicle seating assembly of claim 1, further comprising:
a carriage assembly coupled to the seat base and including a carriage bracket defining a notch, wherein the actuator is disposed within the notch when in a lowered position.

8. The vehicle seating assembly of claim 7, wherein the carriage assembly defines a connecting flange extending from a carriage base, and wherein the actuator is rotatably coupled to the connecting flange and the support member.

9. A seating assembly, comprising:
a track assembly;
a rail cartridge slidably engaged with the track assembly;
a carriage assembly coupled to the rail cartridge;
a seat base coupled to the carriage assembly and translatable fore and aft along the track assembly;
an actuation assembly including first and second electrical connectors, a support member coupled to the second electrical connector, and an actuator coupled to the second electrical connector; and
an engagement member defining opposing grooves, wherein the second electrical connector is operable between engaged and disengaged positions via an engagement between the support member and the opposing grooves of the engagement member.

10. The seating assembly of claim 9, further comprising:
a spacer coupled to an end of the rail cartridge, and wherein the first electrical connector is disposed within the spacer.

11. The seating assembly of claim 10, wherein the spacer defines an opening in an upper portion thereof to receive the second electrical connector when in the engaged position.

12. The seating assembly of claim 10, wherein the support member abuts an upper surface of the spacer when the second electrical connector is in the engaged position.

13. The seating assembly of claim 9, wherein the support member includes opposing sidewalls, and wherein the actuator is coupled to one of the opposing sidewalls.

14. A seat connection assembly, comprising:
a track assembly;
a rail cartridge slidably engaged with the track assembly;
a carriage assembly coupled to the rail cartridge;
an engagement member coupled to the rail cartridge;
a second electrical connector slidably engaged with the engagement member;
a first electrical connector coupled to the rail cartridge; and
an actuator operably coupled to the second electrical connector, wherein the second electrical connector is operable between an engaged position and a disengaged position via the actuator.

15. The seat connection assembly of claim 14, further comprising:
a support member coupled to the second electrical connector and slidably engaged with the engagement member.

16. The seat connection assembly of claim 15, wherein the actuator is rotatably coupled to the support member, and wherein the actuator is operable between raised and lowered positions.

17. The seat connection assembly of claim 15, wherein the support member includes opposing sidewalls coupled together via a connecting base, and wherein the first electrical connector extends through the connecting base.

18. The seat connection assembly of claim 14, further comprising:
a cover member extending at least partially around the second electrical connector.

19. The seat connection assembly of claim 18, wherein the cover member defines a vertical slot, and wherein the actuator extends through the slot.

20. The seat connection assembly of claim 14, further comprising:
a bracket coupled to the carriage assembly, wherein the bracket defines a notch for retaining the actuator when the first electrical connector is in the engaged position.

* * * * *